(12) United States Patent
Kurian et al.

(10) Patent No.: US 12,399,986 B2
(45) Date of Patent: Aug. 26, 2025

(54) AI IMPLEMENTED AI TERMINATION

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 272 days.

(21) Appl. No.: 18/225,210

(22) Filed: Jul. 24, 2023

(65) Prior Publication Data
US 2025/0036754 A1    Jan. 30, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; H04L 63/1425
See application file for complete search history.

(56) References Cited

U.S. PATENT DOCUMENTS

| | | | |
|---|---|---|---|
| 9,654,485 B1* | 5/2017 | Neumann | H04L 63/1416 |
| 2015/0013007 A1* | 1/2015 | Hartrell | H04L 63/1425 726/23 |
| 2022/0116411 A1* | 4/2022 | Melicher | G06F 21/566 |
| 2023/0418943 A1* | 12/2023 | Han | G06N 20/00 |
| 2025/0036754 A1* | 1/2025 | Kurian | G06F 21/554 |

* cited by examiner

*Primary Examiner* — Ponnoreay Pich
(74) *Attorney, Agent, or Firm* — Weiss & Arons LLP

(57) ABSTRACT

Apparatus and methods for an artificial intelligence implemented termination by an auditor artificial intelligence ("aAI") of a malicious artificial intelligence ("mAI") are provided. The aAI may detect a mAI on a network and determine which data the mAI can access on the network. The aAI may then degrade all or part of the data in various ways to prevent the mAI from producing valid content based on the data. The aAI may also create code and inject the code into the mAI to degrade the mAI's operations. As the mAI may rely on valid data to produce valid output, degrading the data may degrade the mAI.

20 Claims, 6 Drawing Sheets

AI IMPLEMENTED AI TERMINATION

FIELD OF TECHNOLOGY

Aspects of the disclosure relate to providing apparatus and methods for artificial intelligence implemented AI termination.

BACKGROUND OF THE DISCLOSURE

Malicious actors may rely on or utilize artificial intelligence/machine learning algorithms to attack or discover data on a network or database.

Watcher or auditor AI's ("aAI") may be used by people or entities to detect intrusion by malicious AI's ("mAI") on a network.

Currently, an aAI's response may be limited to notifying an administrator or taking all or part of a network offline. It may be difficult for an aAI to take any more action than this. These limited actions may allow the mAI to continue to intrude on a network or may disrupt the network to the detriment of the network's users and owners.

Therefore, it would be desirable for apparatus and methods for artificial intelligence implemented termination of an mAI by an aAI.

SUMMARY OF THE DISCLOSURE

It is an object of this disclosure to provide apparatus and methods for artificial intelligence implemented termination over a network of an mAI by an aAI.

An artificial intelligence implemented termination computer program product is provided. The computer program product may include executable instructions. The executable instructions may be executed by a processor on a computer system.

The artificial intelligence implemented termination computer program product may include an auditor artificial intelligence ("aAI").

The instructions may detect a malicious artificial intelligence ("mAI") on a network.

The instructions may identify, by analyzing the mAI, one or more quanta of data located in one or more databases on the network, that the mAI can access or has access to.

The instructions may determine, by analyzing the mAI and the one or more quanta of data, one or more fragments of the one or more quanta of data to degrade. Degrading the data may degrade the performance of the mAI.

The instructions may degrade the one or more fragments identified previously.

The instructions may determine an effect of the degraded one or more fragments on the mAI. When the effect of the degraded one or more fragments on the mAI has not damaged the mAI to less than a pre-determined level of effectiveness, the instructions may degrade one or more additional fragments of the one or more quanta of data. This process may iterate and repeat until the mAI has been damaged to less than a pre-determined level of effectiveness.

In an embodiment, the aAI may degrade the one or more fragments by segregating the one or more fragments in the one or more databases.

In an embodiment, the aAI may degrade the one or more fragments by encrypting the one or more fragments. The mAI may not have access to an encryption key.

In an embodiment, the aAI may degrade the one or more fragments by deleting the one or more fragments, or moving the one or more fragments to a database the mAI cannot access.

In an embodiment, the aAI may degrade the one or more fragments by scrambling the one or more fragments.

In an embodiment, the aAI may degrade the one or more fragments by adding incorrect or extraneous data to the fragments.

In an embodiment, the aAI may degrade the one or more fragments by corrupting the one or more the fragments.

In an embodiment, the network may be the Internet.

In an embodiment, the network may be an internal intranet.

In an embodiment, the instructions may analyze the mAI to determine whether the aAI can successfully inject code into the mAI.

In an embodiment, the instructions may further generate code to restrict access to the one or more databases from the mAI.

In an embodiment, the instructions may further inject the code into the mAI.

In an embodiment, the instructions may further generate code to cause the mAI to cease processing data. In an embodiment, the instructions may then inject the code into the mAI.

In an embodiment, when the code fails, the instructions may iterate and produce second code.

In an embodiment, the instructions may inject the second code into the mAI.

In an embodiment, the instructions may further notify an administrator that the one or more fragments have been degraded.

In an embodiment, the instructions may further save a copy of the one or more fragments in a separate database, before the one or more fragments are degraded.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
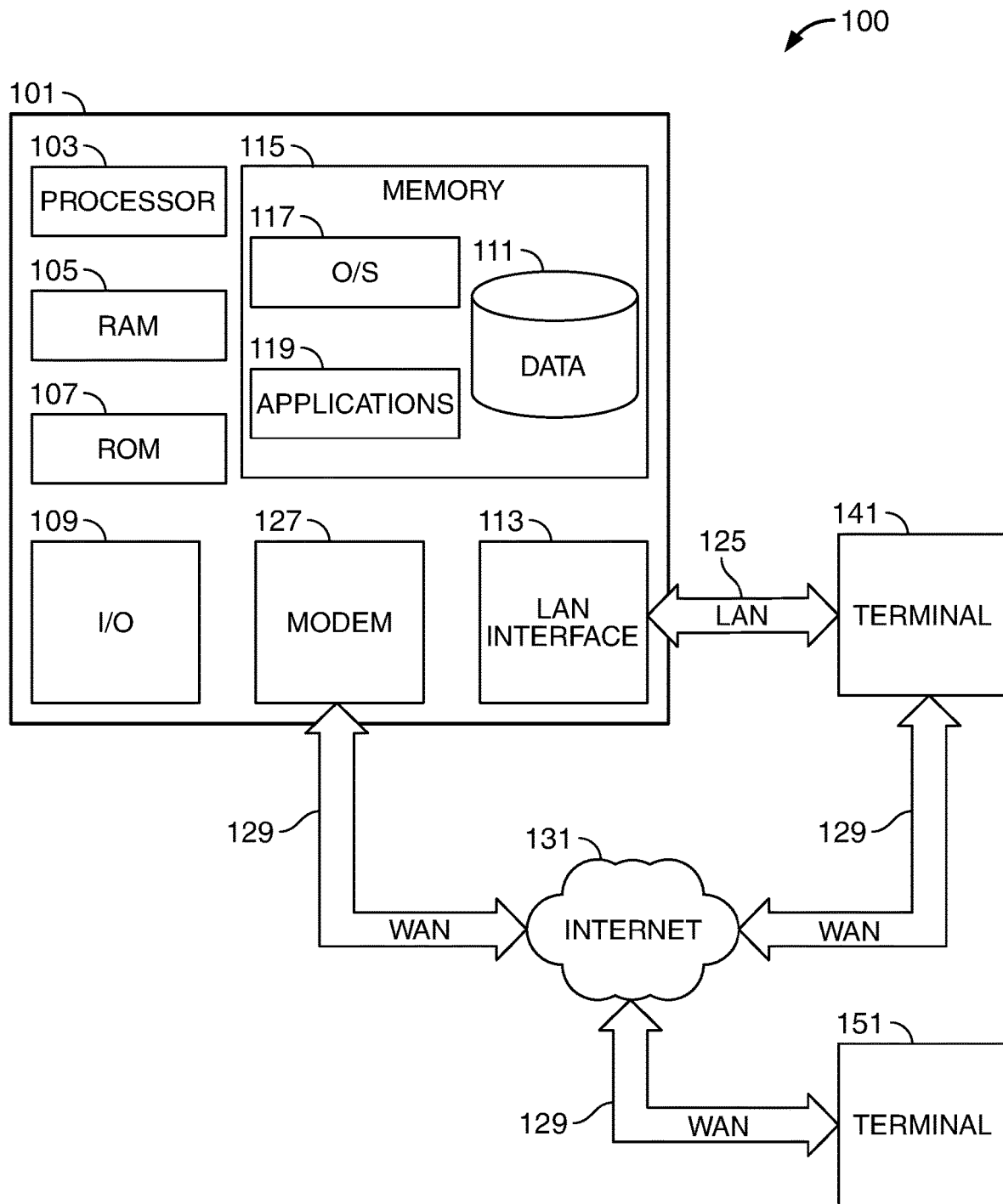
FIG. 1 shows an illustrative apparatus in accordance with principles of the disclosure.

It is an object of this disclosure to provide apparatus and methods for one artificial intelligence program to degrade the performance of and terminate a malicious artificial intelligence program.

An objective of this disclosure may be to provide a malicious artificial intelligence program with so-called 'garbage' data, to automatically give effect to the maxim, "garbage in equals garbage out," or "GIGO" with respect to the malicious artificial intelligence program.

An artificial intelligence implemented termination computer program product is provided. The computer program product may include executable instructions. The executable instructions may be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the artificial intelligence implemented termination program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers and any server or servers, as well as enable the program to communicate with databases. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other internal network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

The artificial intelligence implemented termination computer program product may include an auditor artificial intelligence ("aAI"). The artificial intelligence implemented termination computer program product may be an aAI.

An aAI may be designed to audit or watch network traffic to detect intrusions and activity by other artificial intelligence programs with minimal or no administrator input. Any suitable aAI algorithm or algorithms may be used. An aAI may be trained with training data and/or trained on a live network.

When the executable instructions are executed by a processor on a computer system, they may detect a malicious artificial intelligence ("mAI") on a network. An aAI may continuously, or at set periodic intervals, watch and analyze data moving in and out of a network in order to detect anomalous data. When anomalous data is detected, the aAI may analyze and determine if the anomalous data is caused by an mAI. An mAI may be any artificial intelligence/machine learning ("AI/ML") program that is not supposed to be on the network, even if it is not created by a malicious actor. Even a benign AI/ML program may cause security issues for a network.

All AI/ML programs in this disclosure may be trained with training data or other data. All AI/ML programs in this disclosure may be dependent on incoming data to produce outgoing data. For example, to produce a certain output that it has not produced before and is not within its memory (i.e., a novel output), an AI/ML program may require one or more inputs. These inputs may include prompts or data. In this disclosure, to produce meaningful outputs, an mAI may require 'new' data, that is, data available on the network but not previously available to the mAI. (If the data was previously available to the mAI, there would be no need for the mAI to appear on the network.)

In an embodiment, when an mAI is detected, the aAI may notify a system administrator and/or log the detection.

In an embodiment, when an mAI is detected, the aAI may disconnect some or all of the network, in order to mitigate damage caused by the mAI.

The instructions may identify, by analyzing the mAI, one or more quanta of data located in one or more databases on the network, that the mAI can access or has access to. The network may include various data in various databases. An mAI may have access to one or all of the databases that appear on the network map. Access to any of the data may breach privacy and confidentiality of the data.

The instructions may determine, by analyzing the mAI and the one or more quanta of data, one or more fragments of the one or more quanta of data to degrade. Degrading the data may degrade the performance of the mAI.

The instructions may degrade the one or more fragments identified previously. Degradation may take any suitable form. Degradation may include corrupting the fragments. Degradation may include changing the fragments. Degradation may include segregating the fragments. Degradation may include segregating the data. Degradation may include deleting the fragments. Degradation may include moving the fragments to a different database. Degradation may include hiding the fragments. Degradation may include reducing access ports or access avenues the mAI can use to access the network.

The instructions may determine an effect of the degraded one or more fragments on the mAI. The determination of the effect may be done through any suitable method.

One method may be to silo a version of the mAI and feed it the original data and the degraded data (or other data if the degraded data is deleted) to see the mAI's output(s). Another method may be to simulate the mAI and determine what its output(s) would be with and without the degraded data. Another method may be to measure the output(s) of the mAI after the data has been degraded.

In an embodiment, where the degradation is to delete the data, move the data, or cut off the mAI's access to the data, the determination may be only to validate that the mAI no longer has access to the data.

If the degradation has not had the desired effect and the mAI still is effective and still has access to the data, i.e., when the effect of the degraded one or more fragments on the mAI has not damaged the mAI to less than a predetermined level of effectiveness, the instructions may degrade one or more additional fragments of the one or more quanta of data. Degrading additional data may lower the effectiveness of the mAI further, and below a pre-determined level of effectiveness.

This process may iterate and repeat until the mAI has been damaged to less than a pre-determined level of effectiveness. It may not be required to damage or destroy an mAI completely. A pre-determined level of effectiveness may be, e.g., 50% as effective without any degradation. Reducing the level of effectiveness without destroying the mAI may cause a malicious actor to not trust any of the output of the mAI, as the malicious actor may not be able to tell the difference between a valid output and a garbage output.

In an embodiment, the aAI may degrade the one or more fragments by segregating the one or more fragments in the one or more databases. Segregating the fragments may refer to separating the fragments from the rest of the quanta of data. Once segregated, the data as a whole may become corrupted or less useful to the mAI.

In an embodiment, the aAI may degrade the one or more fragments by encrypting the one or more fragments. Any suitable encryption method may be used. The mAI may not have access to an encryption key.

In an embodiment, the aAI may degrade the one or more fragments by deleting the one or more fragments, or moving the one or more fragments to a database the mAI cannot access. Once accessed to the fragments, or data in general, is removed from the mAI, the degradation may be complete as the mAI will have reduced effectiveness.

In an embodiment, the aAI may degrade the one or more fragments by scrambling the one or more fragments. Scrambling may include rearranging the fragments or data, rearranging the index of the fragments or data, rearranging the structure of the data, or other similar rearrangements.

In an embodiment, the aAI may degrade the one or more fragments by adding incorrect or extraneous data to the fragments. Placing false data into the data may cause the mAI to produce erroneous data. The aAI may generate the incorrect or extraneous data through any suitable method.

In an embodiment, the aAI may degrade the one or more fragments by corrupting the one or more the fragments.

In an embodiment, the network may be the Internet.

In an embodiment, the network may be an internal intranet.

In an embodiment, the instructions may analyze the mAI to determine whether the aAI can successfully inject code into the mAI. Some mAIs may have more robust protection against direct attacks than other mAIs. However, an aAI may be able to determine, after analyzing the mAI, or the mAI's source code, if an injection attack is possible.

In an embodiment, the aAI may search a network, such as the Internet, for details on the mAI. The details may assist the aAI in analyzing the mAI.

In an embodiment, the instructions may further generate code to restrict access to the one or more databases from the mAI. The code may be procedurally generated. The code may be generated by combining existing code fragments from a database. The code may be standard code. The code may be tailored for a particular mAI.

In an embodiment, the instructions may further inject the code into the mAI. Injecting the code into the mAI may be accomplished through any suitable method.

In an embodiment, the instructions may further generate code to cause the mAI to cease processing data. In an embodiment, the instructions may then inject the code into the mAI. The code may be procedurally generated. The code may be generated by combining existing code fragments from a database. The code may be standard code. The code may be tailored for a particular mAI. Injecting the code into the mAI may be accomplished through any suitable method.

In an embodiment, when the code fails, the instructions may iterate and produce second code. The second code may be procedurally generated. The second code may be generated by combining existing code fragments from a database. The second code may be standard code. The second code may be tailored for a particular mAI.

In an embodiment, the instructions may inject the second code into the mAI. Injecting the second code into the mAI may be accomplished through any suitable method.

In an embodiment, the instructions may further notify an administrator that the one or more fragments have been degraded.

In an embodiment, the instructions may further save a copy of the one or more fragments in a separate database, before the one or more fragments are degraded. Saving the data elsewhere may help keep the data from being compromised by the mAI while still allowing the owner or user of the data to access the data.

An apparatus for artificial intelligence implemented termination is provided. The apparatus may include a central server and one or more databases. The databases may be at the central server or remote from the central server.

The central server may include a server communication link, a server processor, and a server non-transitory memory.

The server non-transitory memory may be configured to store at least a server operating system, and an artificial intelligence implemented termination application ("aAI").

The aAI may detect a malicious artificial intelligence ("mAI") on a network.

The aAI may identify, by analyzing the mAI, one or more quanta of data on the one or more databases that the mAI can access.

The aAI may determine, by analyzing the mAI and the one or more quanta of data, one or more fragments of the one or more quanta of data to degrade to reduce the effectiveness of the mAI.

The aAI may degrade the one or more fragments.

The aAI may determine an effect of the degraded one or more fragments on the mAI. When the effect of the degraded one or more fragments on the mAI has not damaged the mAI to less than a pre-determined level of effectiveness, the aAI may degrade one or more additional fragments of the one or more quanta of data. This process may repeat an iterate until the mAI's effectiveness has been reduced below a pre-determined level.

A method for artificial intelligence implemented termination is provided. The method may include the step of detecting, by an auditor AI ("aAI") on a central server, a malicious artificial intelligence ("mAI") on a network.

The method may include the step of identifying, by analyzing the mAI, one or more quanta of data, located in one or more databases on the network, that the mAI can access.

The method may include the step of determining, by analyzing the mAI and the one or more quanta of data, one or more fragments of the one or more quanta of data to degrade.

The method may include the step of degrading the one or more fragments.

The method may include the step of determining an effect of the degraded one or more fragments on the mAI.

When the effect of the degraded one or more fragments on the mAI has not damaged the mAI to less than a pre-determined level of effectiveness, the method may include the step of degrading one or more additional fragments of the one or more quanta of data.

In an embodiment, the aAI may utilize one or more artificial intelligence/machine learning ("AI/ML") algorithms.

Any suitable AI/ML algorithm(s) may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

In an embodiment, the analysis may apply one or more filtering rules in its determinations. These filtering rules may be static. The filtering rules may be dynamic. The filtering rules may be adjusted automatically by the program. The filtering rules may include the type of mAI, what data is available on the network, what data the mAI may have had access to, and what the goal of the mAI is (e.g., information gathering or attacking).

In an embodiment, the one or more filtering rules may be supplied by an administrator. The administrator may set each rule manually or through another program. In an embodiment, even rules supplied by an administrator may be adjusted automatically by the program, as the program learns more about each mAI.

In an embodiment, the instructions may be trained with a training set of data. The more data provided to the AI/ML algorithms, the more accurate the algorithms may be. The training set of data may be annotated. The training set of data may be curated.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more AI/ML algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
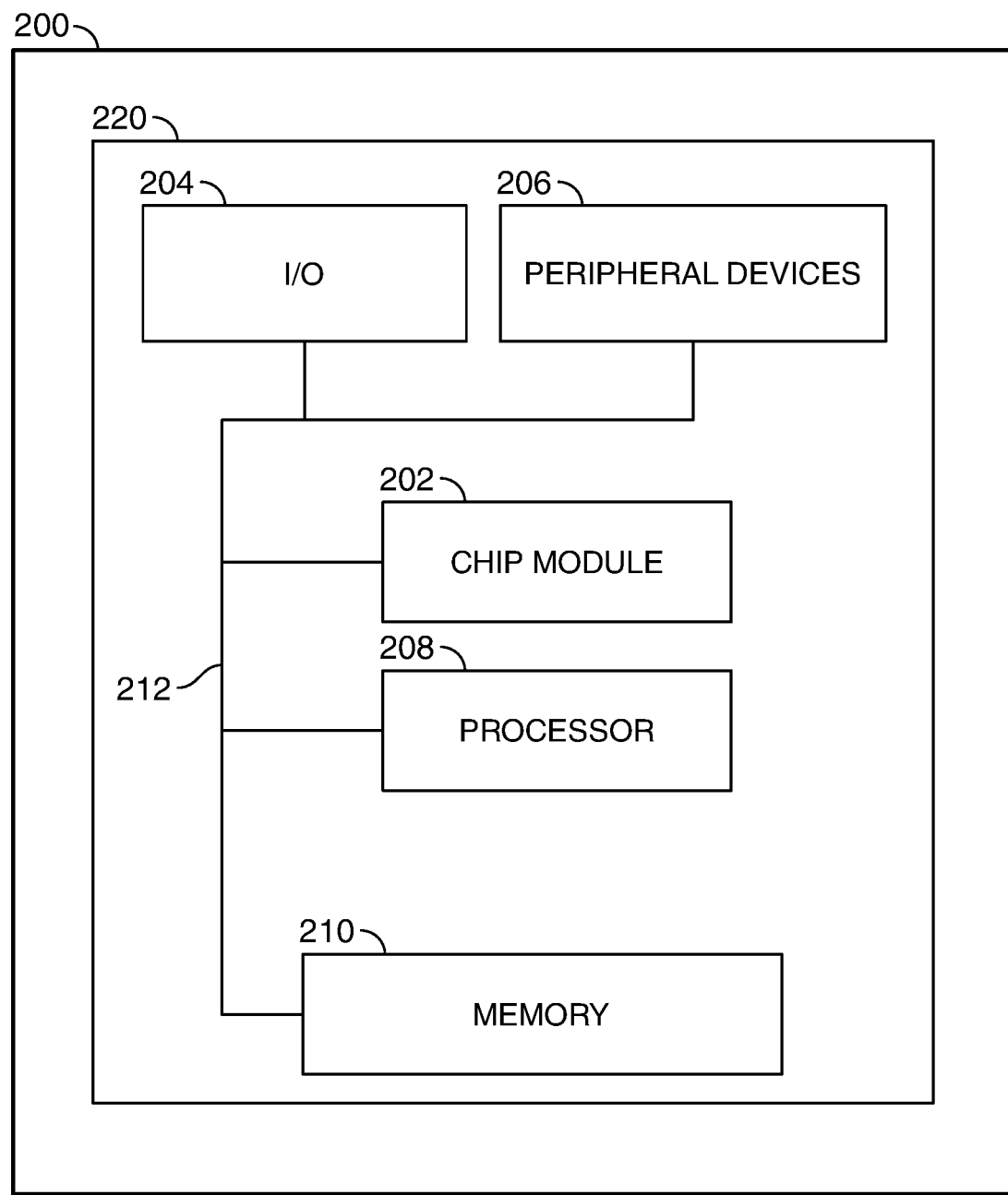
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
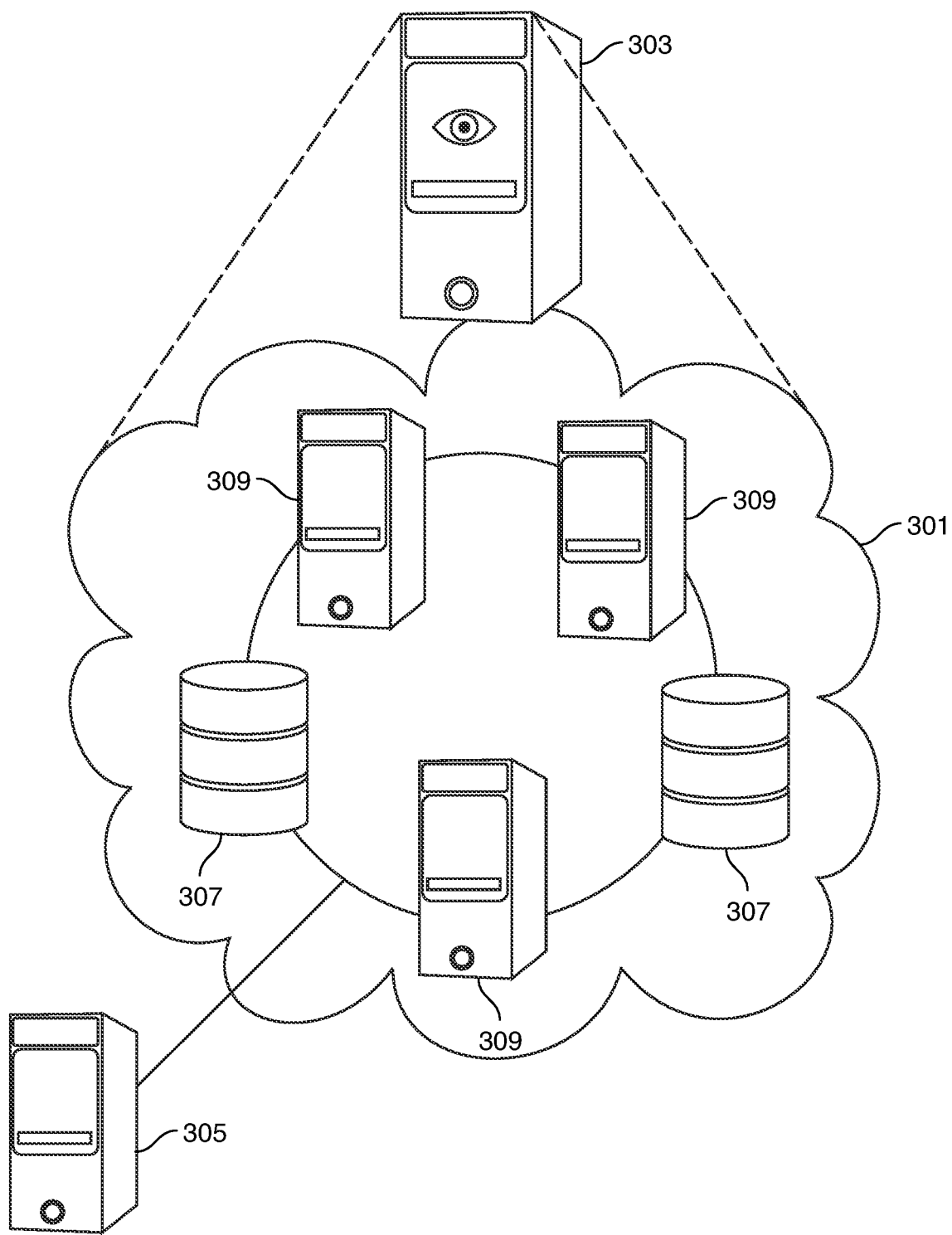
FIG. 3 shows an illustrative schematic in accordance with principles of the disclosure.

FIG. 3 shows an illustrative schematic in accordance with principles of the disclosure. Apparatus may include any of the components and systems odd-numbered 301 through 309, among other components.

A network 301 may include multiple computers or servers 309 as well as databases 307.

An auditor AI ("aAI") 303 on a computer or server may be a part of network 301 or may communicate with network 301.

The aAI may audit or watch the network 301 for a malicious AI ("mAI") 305. An mAI may attack the network 301 at any point and may gain access to computers 309 and databases 307.

Databases 307 may contain various data that may be compromised by an mAI 305.

Figure 4:
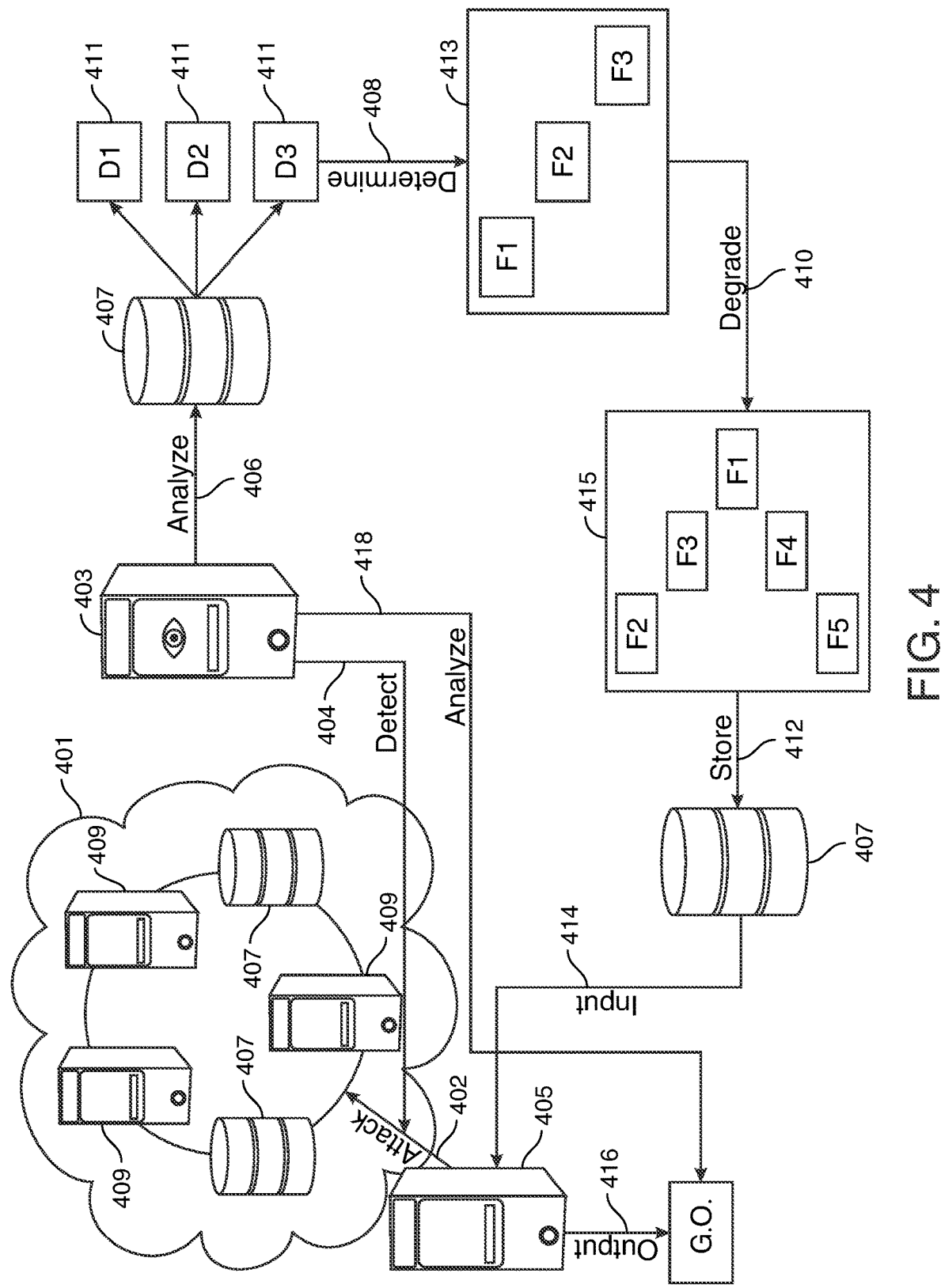
FIG. 4 shows an illustrative schematic in accordance with principles of the disclosure.

FIG. 4 shows an illustrative schematic in accordance with principles of the disclosure. Apparatus may include any of the components and systems odd-numbered 401 through 417, among other components, as well as steps or actions even-numbered 402 through 418 labeled on FIG. 4. Steps may be performed on the apparatus shown in FIGS. 1-3, and 6 or other apparatus shown in other figures or described elsewhere.

At step 402, an mAI 405 may attack a network 401. Network 401 may include various computers or servers 409 and databases 407. The mAI may access data on databases 407.

At step 404, an aAI 403 may detect the mAI's 405 attack on network 401.

At step 406, the aAI 403 may analyze the mAI 405 and databases 407 to determine which data 411 the mAI 405 may have access to based on the mAI's 405 attack.

At step 408, the aAI 403 may determine which fragments 413 of data 411 to degrade to terminate, stop, or reduce the effectiveness of the mAI.

At step 410, the aAI 403 may degrade the fragments 413 in various ways to produce degraded fragments 415. In an embodiment, the aAI 403 may combine two or more degradation methods.

At step 412, the degraded fragments 415 may be stored in the databases 407 which the mAI 405 may have access to.

At step 414, the degraded fragments 415 may be input in the mAI 405, by the mAI 405.

At step 416, the mAI 405 may produce an output 417. If the degradation at step 410 was effective, the output 417 may be garbage output.

At step 418, the aAI 403 may analyze the output 417 to determine if the degradation at step 410 was effective at reducing the effectiveness of the mAI 405 or not.

Figure 5:
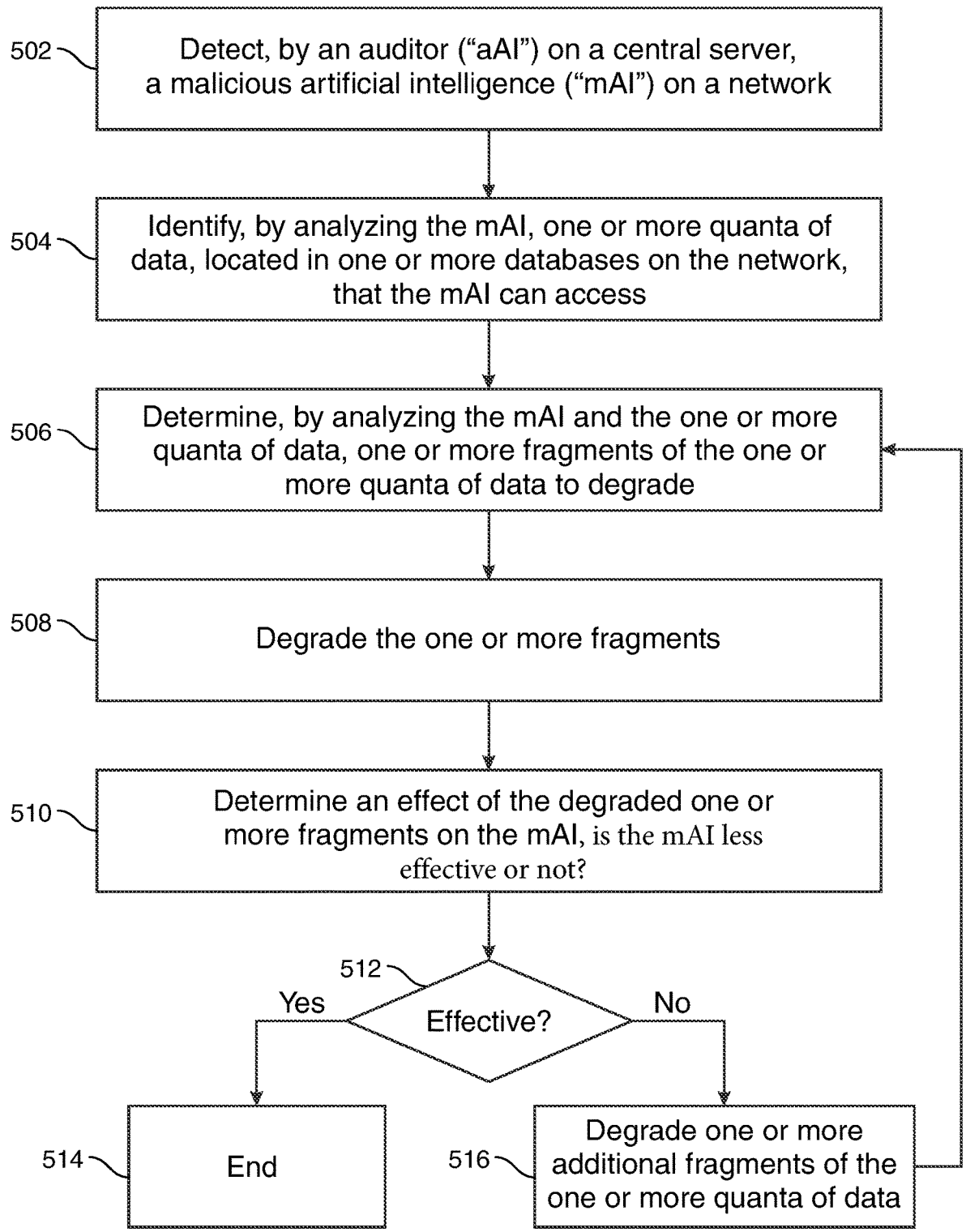
FIG. 5 shows an illustrative flowchart in accordance with principles of the disclosure.

FIG. 5 shows an illustrative flowchart in accordance with principles of the disclosure. Methods may include some or all of the method steps numbered 502 through 516. Methods may include the steps illustrated in FIG. 5 in an order different from the illustrated order. The illustrative method shown in FIG. 5 may include one or more steps performed in other figures or described herein. Steps 502 through 516 may be performed on the apparatus shown in FIGS. 1-4, 6 or other apparatus.

At step 502, an auditor or watcher AI, located on a server (centralized or distributed), may detect an mAI attacking or existing on a network. The mAI may be any AI program that was not installed on the network by the network's owner and/or administrator.

At step 504, the aAI may identify one or more quanta of data that the mAI may have access to. The one or more quanta of data may be on one or more databases in the network. The aAI may identify the one or more quanta of data by analyzing the mAI and the network.

All data on the network may be stored in a database. The database may be on the central server. The database may be distributed across multiple computers. The database may be a distributed ledger. The distributed ledger may be a blockchain.

At step 506, the aAI may determine which quanta of data, or parts/fragments of the quanta of data to degrade in order to reduce the effectiveness of the mAI. The aAI may make its determination by analyzing the mAI and the one or more quanta of data. One objective of degrading some or all of the data may be to put into practice the maxim "garbage in=garbage out." Degradation may take one or more forms, as described in this disclosure.

In an embodiment, the aAI may combine two or more methods of degradation.

At step 508, the aAI may degrade some or all of the fragments of data, or some or all of the quanta of data, determined at step 506.

At step 510, the aAI may determine what effect, if any, the degradation at step 508 had on the mAI. The aAI may do this determination by analyzing the mAI or by applying certain rules. For example, one rule may be that if the degradation was removing the data from the network, the degradation may be deemed effective, as the mAI no longer has access to that data. However, in an embodiment, this may not be sufficient as the mAI may have copied the data before the degradation. In this scenario, additional measures may have to be taken to reduce the effectiveness of the mAI, including, for example, injecting code into the mAI.

At step 512, the aAI may ask if the degradation was effective or not.

At step 514, if the degradation was effective, the aAI may end its actions.

At step 516, if the degradation was not effective in lowering the effectiveness of the mAI to below a predetermined level of effectiveness, the aAI may degrade additional data, and/or degrade the data in one or more different manners. This may reset the method to step 506 or 508.

Figure 6:
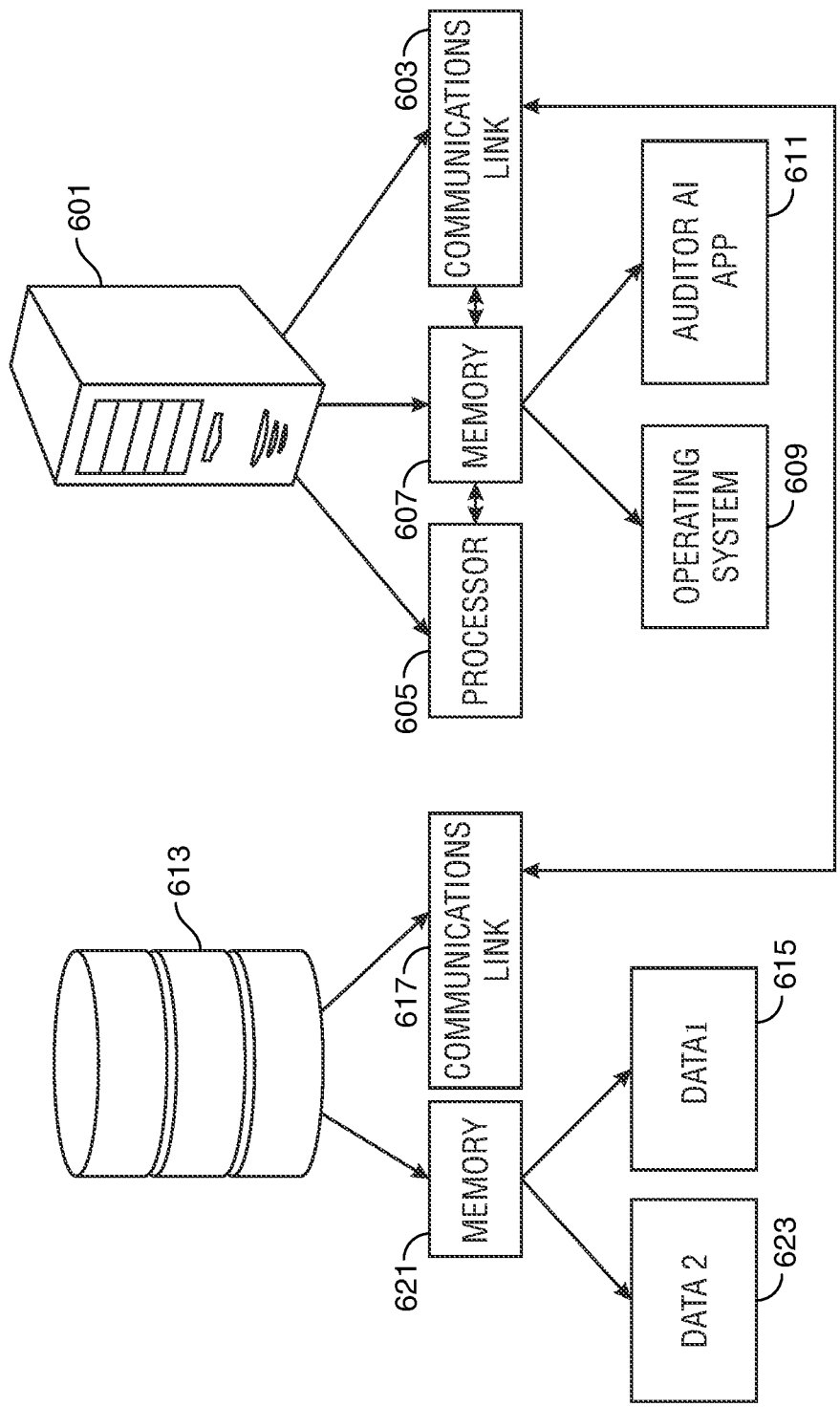
FIG. 6 shows an illustrative apparatus in accordance with principles of the disclosure.

FIG. 6 shows an illustrative apparatus in accordance with principles of the disclosure. The apparatus may include a central server 601 and one or more databases 613.

The central server 601 may include a server communications link 603, a server processor/processors 605, and a server non-transitory memory 607, as well as other components.

Each of the one or more databases 613 may include a database communications link 617, a database processor or processors, and a database non-transitory memory 621.

The server non-transitory memory 607 may include a server operating system 609, an auditor AI 611, as well as other data and programs.

The server communications link 603 may communicate with each database 613 (as well as other servers/computers, not shown, in a network) through node communications link 617. The aAI 611 may communicate with all databases 613 through the server communications link 603.

Each database non-transitory memory 621 may include a data2 623, and data 615, as well as other data and programs.

The aAI 611 may detect a malicious artificial intelligence ("mAI") on a network where the database 613 is located.

The aAI 611 may identify, by analyzing the mAI, one or more quanta of data 623 or 615 on the one or more databases 613 that the mAI can access.

The aAI 611 may determine, by analyzing the mAI and the one or more quanta of data 623 or 615, one or more fragments of the one or more quanta of data 623 or 615 to degrade to reduce the effectiveness of the mAI.

The aAI 611 may degrade the one or more fragments through one or more degradation methods or processes.

The aAI 611 may determine an effect of the degraded one or more fragments on the mAI, if any.

When the effect of the degraded one or more fragments on the mAI has not damaged the mAI to less than a pre-determined level of effectiveness, the aAI 611 may degrade one or more additional fragments of the one or more quanta of data 623 or 615.

Thus, apparatus and methods to automatically terminate or reduce the effectiveness of a malicious artificial intelligence are provided. Persons skilled in the art will appreciate that the present invention can be practiced by other than the described embodiments, which are presented for purposes of illustration rather than of limitation.

What is claimed is:

1. An artificial intelligence implemented termination computer program product, the computer program product comprising a non-transitory computer readable medium containing executable instructions, the executable instructions when executed by a processor on a computer system:
   detect a malicious artificial intelligence ("mAI") on a network;
   identify, by analyzing the mAI, one or more quanta of data located in one or more databases on the network, that the mAI can access;
   determine, by analyzing the mAI and the one or more quanta of data, one or more fragments of the one or more quanta of data to degrade;
   degrade the one or more fragments;
   determine an effect of the degraded one or more fragments on the mAI; and
   when the effect of the degraded one or more fragments on the mAI has not damaged the mAI to less than a pre-determined level of effectiveness, degrade one or more additional fragments of the one or more quanta of data;
wherein:
the artificial intelligence implemented termination computer program product comprises an auditor artificial intelligence ("aAI").

2. The artificial intelligence implemented termination computer program product of claim 1 wherein the aAI degrades the one or more fragments by segregating the one or more fragments in the one or more databases.

3. The artificial intelligence implemented termination computer program product of claim 1 wherein the aAI degrades the one or more fragments by encrypting the one or more fragments.

4. The artificial intelligence implemented termination computer program product of claim 1 wherein the aAI degrades the one or more fragments by deleting the one or more fragments.

5. The artificial intelligence implemented termination computer program product of claim 1 wherein the aAI degrades the one or more fragments by scrambling the one or more fragments.

6. The artificial intelligence implemented termination computer program product of claim 1 wherein the aAI degrades the one or more fragments by adding incorrect data to the fragments.

7. The artificial intelligence implemented termination computer program product of claim 1 wherein the aAI degrades the one or more fragments by corrupting the one or more the fragments.

8. The artificial intelligence implemented termination computer program product of claim 1 wherein the network is the Internet.

9. The artificial intelligence implemented termination computer program product of claim 1 wherein the instructions analyze the mAI to determine whether the aAI can successfully inject code into the mAI.

10. The artificial intelligence implemented termination computer program product of claim 1 wherein the network is an internal intranet.

11. The artificial intelligence implemented termination computer program product of claim 9 wherein the instructions further generate code to restrict access to the one or more databases from the mAI.

12. The artificial intelligence implemented termination computer program product of claim 11 wherein the instructions further inject the code into the mAI.

13. The artificial intelligence implemented termination computer program product of claim 9 wherein the instructions further generate code to cause the mAI to cease processing data.

14. The artificial intelligence implemented termination computer program product of claim 13 wherein the instructions inject the code into the mAI.

15. The artificial intelligence implemented termination computer program product of claim 14 wherein, when the code fails, the instructions iterate and produce second code.

16. The artificial intelligence implemented termination computer program product of claim 15 wherein the instructions inject the second code into the mAI.

17. The artificial intelligence implemented termination computer program product of claim 1 wherein the instructions further notify an administrator that the one or more fragments have been degraded.

18. The artificial intelligence implemented termination computer program product of claim 1 wherein the instructions further save a copy of the one or more fragments before the one or more fragments are degraded in a separate database.

19. An apparatus for artificial intelligence implemented termination, the apparatus comprising:
   a central server, the central server comprising:
      a server communication link;
      a server processor; and
      a server non-transitory memory configured to store at least:
         a server operating system; and
         an artificial intelligence implemented termination application ("aAI"); and
   one or more databases;
   wherein the aAI:
      detects a malicious artificial intelligence ("mAI") on a network;
      identifies, by analyzing the mAI, one or more quanta of data on the one or more databases that the mAI can access;
      determines, by analyzing the mAI and the one or more quanta of data, one or more fragments of the one or more quanta of data to degrade;
      degrades the one or more fragments;
      determines an effect of the degraded one or more fragments on the mAI; and
      when the effect of the degraded one or more fragments on the mAI has not damaged the mAI to less than a pre-determined level of effectiveness, degrades one or more additional fragments of the one or more quanta of data.

20. A method for artificial intelligence implemented termination, the method comprising the steps of:
- detecting, by an auditor AI ("aAI") on a central server, a malicious artificial intelligence ("mAI") on a network;
- identifying, by analyzing the mAI, one or more quanta of data, located in one or more databases on the network, that the mAI can access;
- determining, by analyzing the mAI and the one or more quanta of data, one or more fragments of the one or more quanta of data to degrade;
- degrading the one or more fragments;
- determining an effect of the degraded one or more fragments on the mAI; and
- when the effect of the degraded one or more fragments on the mAI has not damaged the mAI to less than a pre-determined level of effectiveness, degrading one or more additional fragments of the one or more quanta of data.

* * * * *